United States Patent
Li et al.

(10) Patent No.: US 11,631,261 B2
(45) Date of Patent: Apr. 18, 2023

(54) METHOD, SYSTEM, SERVER, AND STORAGE MEDIUM FOR LOGISTICS MANAGEMENT BASED ON QR CODE

(71) Applicant: SOUTHERN UNIVERSITY OF SCIENCE AND TECHNOLOGY, Guangdong (CN)

(72) Inventors: Guiying Li, Shenzhen (CN); Peng Yang, Shenzhen (CN); Ke Tang, Shenzhen (CN); Xin Yao, Shenzhen (CN)

(73) Assignee: SOUTHERN UNIVERSITY OF SCIENCE AND TECHNOLOGY, Shenzhen (CN)

(*) Notice: Subject to any disclaimer, the term of this patent is extended or adjusted under 35 U.S.C. 154(b) by 0 days.

(21) Appl. No.: 17/882,098

(22) Filed: Aug. 5, 2022

(65) Prior Publication Data
US 2022/0375243 A1    Nov. 24, 2022

Related U.S. Application Data (63) Continuation of application No. PCT/CN2022/080037, filed on Mar. 9, 2022.

(30) Foreign Application Priority Data

Apr. 30, 2021 (CN) .......................... 202110480598.9

(51) Int. Cl.
*G06V 30/224* (2022.01)
*G06V 10/82* (2022.01)
(Continued)

(52) U.S. Cl.
CPC ..... *G06V 30/224* (2022.01); *G06K 19/06037* (2013.01); *G06Q 10/087* (2013.01); *G06V 10/82* (2022.01); *G06V 2201/07* (2022.01)

(58) Field of Classification Search
None
See application file for complete search history.

(56) References Cited

U.S. PATENT DOCUMENTS

2022/0332504 A1* 10/2022 Voegele ................ G06T 7/0006

FOREIGN PATENT DOCUMENTS

| CN | 107423928 A | 12/2017 |
|----|-------------|---------|
| CN | 108290691 A | 7/2018  |

(Continued)

OTHER PUBLICATIONS

International Search Report dated May 18, 2022 in corresponding International application No. PCT/CN2022/080037; 6 pages.

*Primary Examiner* — Leon Flores
(74) *Attorney, Agent, or Firm* — Maier & Maier, PLLC (57) ABSTRACT

A method of logistics management based on QR code, the method includes: acquiring a video stream of a logistics box taken by a camera of a logistics box passing through an identification area, the logistics box having a corresponding QR code affixed to its surface; performing target detection on the video stream based on a predetermined neural network model to obtain a QR code image and a logistics box image, respectively; identifying the QR code image to generate QR code information; detecting and tracking the logistics box images in sequence to generate logistics box information; matching the QR code information and logistics box information, generating matching information, and updating logistics inventory information based on the matching information.

9 Claims, 4 Drawing Sheets

(51) Int. Cl.
  *G06K 19/06* (2006.01)
  *G06Q 10/087* (2023.01)

(56) References Cited

FOREIGN PATENT DOCUMENTS

| | | |
|---|---|---|
| CN | 109583535 A | 4/2019 |
| CN | 112215022 A | 1/2021 |
| CN | 113191469 A | 7/2021 |
| CN | 113449532 A | 9/2021 |
| KR | 20150075562 A | 7/2015 |

* cited by examiner

METHOD, SYSTEM, SERVER, AND STORAGE MEDIUM FOR LOGISTICS MANAGEMENT BASED ON QR CODE

CROSS-REFERENCES TO RELATED APPLICATIONS

This application is a bypass continuation application of PCT application No. PCT/CN2022/080037 filed on Mar. 9, 2022, which claims priority to Chinese patent application No. 202110480598.9 filed on Apr. 30, 2021, the contents of each of the above application are hereby incorporated by reference.

FIELD

The present disclosure relates to the field of logistics management, in particular, to a method, system, server, and storage medium for logistics management based on QR code.

BACKGROUND

In a complex logistics factory, logistics forklift trucks carry logistics boxes in and out of the factory at high speed and frequently, the problem is how to accurately and quickly obtain the information of QR code on the logistics boxes. Traditional logistics information recording method is very tedious, which requires manual recording of logistics box information, or scanning the static QR code to obtain the information.

However, in the logistics process, it is difficult to locate and identify the QR code accurately due to high-speed movement of the express mail. In the actual logistics factory, the logistics box is transmitted very fast and keeps changing position, so it is difficult to obtain accurate QR code information when traveling at high speed, which leads to inaccurate information acquisition of logistics box, and results in inefficient, time-consuming and error-prone logistics information management.

SUMMARY

The present disclosure provides a method, system, server, and storage medium for logistics management based on QR code that solves the challenge of locating and identifying the QR code that moves at high speed in logistics scenarios. The addition of a robust end-to-end AI solution in this application scenario accelerates the overall development effort and unleashes greater real-time performance.

In a first aspect, the present disclosure provides a method for logistics management based on QR code, which comprises:

acquiring a video stream taken by a camera of a logistics box passing through an identification area, the logistics box having a corresponding QR code affixed to surface;

performing target detection of the video stream based on a predetermined neural network model to obtain a QR code image and a logistics box image, respectively;

identifying the QR code image to generate QR code information;

detecting and tracking the logistics box image in sequence to generate logistics box information;

matching the QR code information and logistics box information, generating matching information, and updating logistics inventory information based on the matching information.

Further, before performing target detection of the video stream based on a predetermined neural network model to obtain a QR code image and a logistics box image, respectively, the method comprises: pre-processing the video stream.

Further, before identifying the QR code image to generate QR code information, the method comprises:
correcting the QR code image.

Further, pre-processing the video stream comprises:
decoding the video stream;
denoising the decoded video stream.

Further, performing target detection on the video stream based on a predetermined neural network model to obtain a QR code image and a logistics box image, respectively, comprises:
identifying the QR code image in the video stream based on a predetermined first view model;
identifying the logistics box image in the video stream based on a predetermined second view model;
intercepting the QR code image and the logistics box image from the video stream.

Further, correcting the QR image comprises:
re-sizing multiple the QR code images to a uniform size; and/or
adjusting a contrast and brightness of the QR image to a preset value; and/or
grayscale converting the QR code image; and/or
filtering the QR code image; and/or
binarizing the QR code image; and/or
detecting the QR code image by Canny edge detector; and/or
applying Hough operator fitted straight line and affine transformation to the QR code image.

In a second aspect, the present disclosure provides a system for logistics management based on QR code, which comprises:

an acquisition module, configured to obtain a video stream taken by a camera of a logistics box passing through an identification area, the logistics box having a corresponding QR code affixed to surface.

a target detection module, configured to perform target detection of the video stream based on a predetermined neural network model to obtain a QR code image and a logistics box image, respectively.

a QR code identification module, configured to identify the QR code image to generate QR code information.

a logistics box identification module, configured to detect and track the logistics box image in sequence to generate logistics box information.

a matching module, configured to match the QR code information and logistics box information, generate matching information, and update logistics inventory information based on the matching information.

Further, the system comprises: a video stream pre-processing module, configured to pre-process the video stream.

In a third aspect, the present disclosure provides a server which comprises a memory, a processor, and a program stored in the memory which is runnable on the processor, the processor executes the program to implement a method for logistics management based on the QR code as described above.

In a fourth aspect, the present disclosure provides a terminal readable storage medium on which a program is stored, the program is capable, when executed by a processor, of implementing a method for logistics management based on the QR code as described above.

The disclosure detects a video stream to intercept a QR code and a logistics image in the area, and identifies information on the QR code information and the logistics box, to realize the matching management of the QR code and the logistics box, and avoid the aggregation of difficulty in locating and identifying the QR code in the logistics transmission process while moving at high speed. At the same time, the process can collect the data for analysis and processing due to acquiring the video stream collected by the camera in real time, realizing an end-to-end AI automatic solution of the matching problem, which can accelerate the progress of logistics information identification and management efficiency.

DETAILED DESCRIPTION

The present disclosure is described in further detail below in combination with the drawings and embodiments. It should be understood that the specific embodiments described herein are intended to explain the disclosure only and are not intended to limit the disclosure. It is also to be noted that, for ease of description, the drawings only show a portion, but not all, of the structure relating to the present disclosure.

Before discussing the embodiments in more detail, it should be mentioned that some of the embodiments are described as processing or methods depicted as flow charts. Although the flow charts depict the steps as sequential processing, many of the steps may be implemented in parallel, concurrently, or simultaneously. In addition, the order of the steps may be rearranged. Processing may be terminated when its operation is complete, but may also have additional steps that are not included in the drawings. The processing may correspond to methods, functions, protocols, subroutines, subprograms, etc.

In addition, the terms "first", "second", etc. may be used herein to describe various directions, actions, steps or elements, etc., but the directions, actions, steps or elements are not limited by these terms. These terms are used only to distinguish a first direction, action, step, or element from another direction, action, step, or element. By way of example, without departing from the scope of the present application, the first packing module may be a second packing module or a third packing module, and similarly, the second packing module, and the third packing module may be a first packing module. The first packing module, the second packing module, and the third packing module are all packing modules of the distributed file system, but they are not the same packing module. The terms "first", "second", etc. are not to be understood as indicating or implying relative importance or implicitly specifying the number of technical features indicated. Thus, a feature qualified with "first" and "second" may explicitly or implicitly include one or more such features. In the description of the disclosure, "plurality" or "bulk" means at least two, such as two, three, etc., unless otherwise expressly and specifically limited.

Embodiment 1

Figure 1:
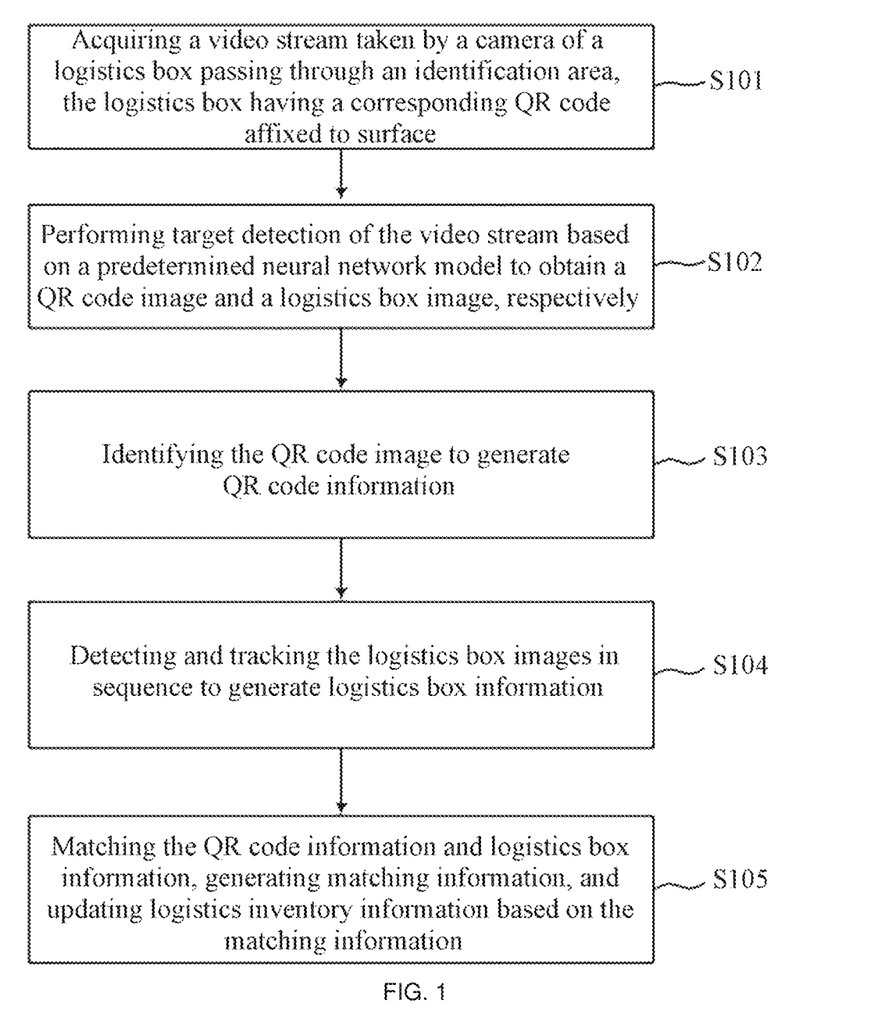
FIG. 1 is a flow chart of a method for logistics management based on QR code in Embodiment 1 of the present disclosure.

The present embodiment provides a method for logistics management based on QR code for express logistics scenarios where information matching of express shipments is required to update logistics inventory information while the express shipment box or express shipment rack is running at high speed on a conveyor belt, as shown in FIG. 1.

S101, acquiring a video stream taken by a camera of a logistics box passing through an identification area, the logistics box having a corresponding QR code affixed to surface.

In the present embodiment, a camera is set up on the Jetson Nano development board to capture footage of the movement of logistics boxes in and out of a logistics factory. The camera dynamically captures and tracks a data stream as the logistics pieces move by at high speed. The video stream data is captured by the camera, and transferred to the Jetson Nano development board for subsequent logic processing. Alternatively, the process can also be performed via a PC-based camera or other edge-side smart device that can capture video and can be used for subsequent logic processing via a high-performance server. Wherein, the edge-side smart device refers to a device with low power consumption and qualified computational performance, and the high performance server refers to a device where high power consumption can achieve optimal performance.

The system executes the identification operation when the logistics pieces pass through the identification area, which can be executed by the conveyor belt, logistics carrier car, transmission robot, etc.

S102, performing target detection of the video stream based on a predetermined neural network model to obtain a QR code image and a logistics box image, respectively.

In the present step, both the QR code image and the logistics box image can be acquired once or more for the same logistics box with the QR code attached. In the subsequent image processing and identification process, a correction can be performed based on multiple QR code images to achieve accuracy in the identification of QR code information.

The target detection is to detect and accurately frame both the QR code and the logistics box in the image, and then intercept the detected targets for different follow-up operations.

In the present step, before target detection, a pre-trained deep learning neural network model needs to be trained, including testing the accuracy and recall rate of target detection. For example, the YoloV3-tiny neural network is trained to achieve a high recall and precision, such as a recall ≥99.3% and a precision ≥91% in one experiment.

S103. identifying the QR code image to generate QR code information.

S104, detecting and tracking the logistics box images in sequence to generate logistics box information.

In the present step, by tracking the movements of the logistics box, to acquire the video stream by the tracking device (i.e., the camera mentioned in the above step), obtain the movements from the video stream, and frame them out in the video stream. The detection tracking of the logistics box image is performed using the KLT technique, KLT Target Tracking Kanade-Lucas-Tomasi, which uses the changes in the time domain of pixels in the image sequence and the relationship between adjacent frames to find the correspondence that exists between the previous frame and the current frame, thus calculating the information about the movements of the object between adjacent frames. It performs well in tracking, especially in terms of real-time computational speed, and is robust. Moreover, in the present implementation, it is able to identify and track the features of the object to be tracked more accurately, so that the features can be identified more easily.

S105, matching the QR code information and logistics box information, generating matching information, and updating logistics inventory information based on the matching information.

The matching of logistics box and QR code information in the present step refers to the numbering of the detected targets after the output of the target detection network for tracking through KLT, and the matching is done by calculating the Intersection-Over-Union of logistics box and QR code at the same time, so as to determine their position relationship, and matching and outputting the result by outputting their numbering information and position relationship.

In the present embodiment, the deep learning technique is able to analyze the unstructured data input from the camera in real time to obtain the valuable content therein and output structured data (as at the end of the present embodiment).

In the disclosure the video stream is detected to intercept the QR code image and logistics image in the area, and the QR code and the information is identified on the logistics box, realizing the matching management of the QR code and the logistics box, avoiding the aggregation of difficulty in locating and identifying the QR code in the logistics transmission process moving at high speed. At the same time, the process can collect this data for analysis and processing due to access to the video stream collected by the camera in real time, realizing an end-to-end AI automatic solution of the matching problem, which can accelerate the progress of logistics information identification and management efficiency.

Embodiment 2

Figure 2:
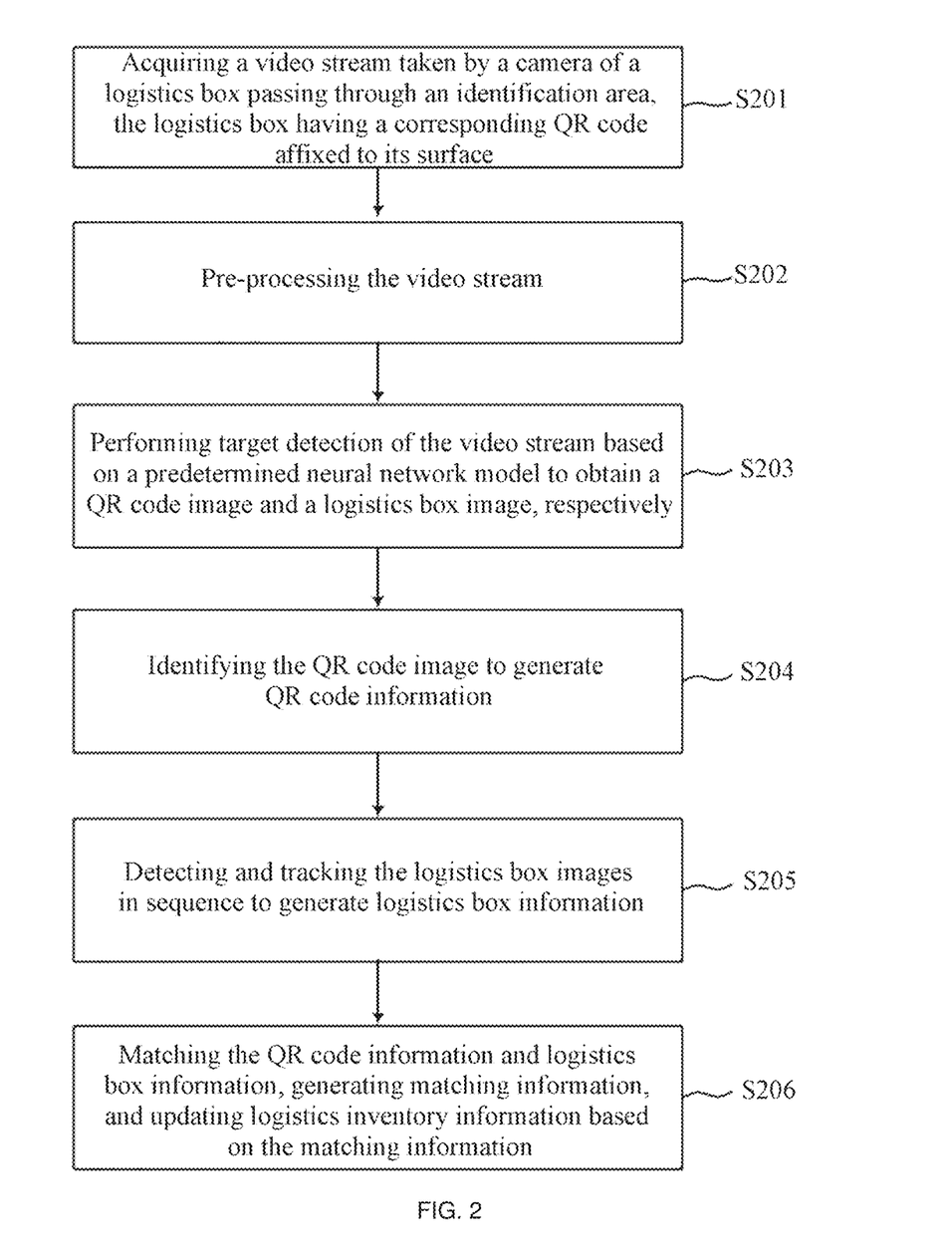
FIG. 2 is a flow chart of a method for logistics management based on QR code in Embodiment 2 of the present disclosure.

The present embodiment describes in detail how to identify and correct an image using a predetermined algorithm based on the above embodiment, as shown in FIG. 2, and comprises the steps of:

S201, acquiring a video stream taken by a camera of a logistics box passing through an identification area, the logistics box having a corresponding QR code affixed to its surface.

S202, pre-processing the video stream.

In the present step, the pre-processing process is used to denoise the data, remove the light source and other operations to achieve the effect of eliminating irrelevant information from the image and improve the detectability of the relevant information of the QR code image and/or logistics box image. The pre-processing is performed by: decoding the video stream; and denoising the decoded video stream.

Exemplarily, hardware decoding video streams is performed using GStreamer, which encapsulates each part of the processing flow into individual plug-ins, each responsible for a different task, enabling streaming processing to increase the decoding rate. The video stream is decoded into a frame by frame image, and finally the single frame is passed to the inference model for inference analysis.

S203, performing target detection of the video stream based on a predetermined neural network model to obtain a QR code image and a logistics box image, respectively.

The step includes: identifying a QR code image in the video stream based on a predetermined first view model; identifying a logistics box image in the video stream based on a predetermined second view model; and intercepting the QR code image and the logistics box image from the video stream.

S204, identifying the QR code image to generate QR code information.

S205, detecting and tracking the logistics box images in sequence to generate logistics box information.

S206, matching the QR code information and logistics box information, generating matching information, and updating logistics inventory information based on the matching information.

Figure 3:
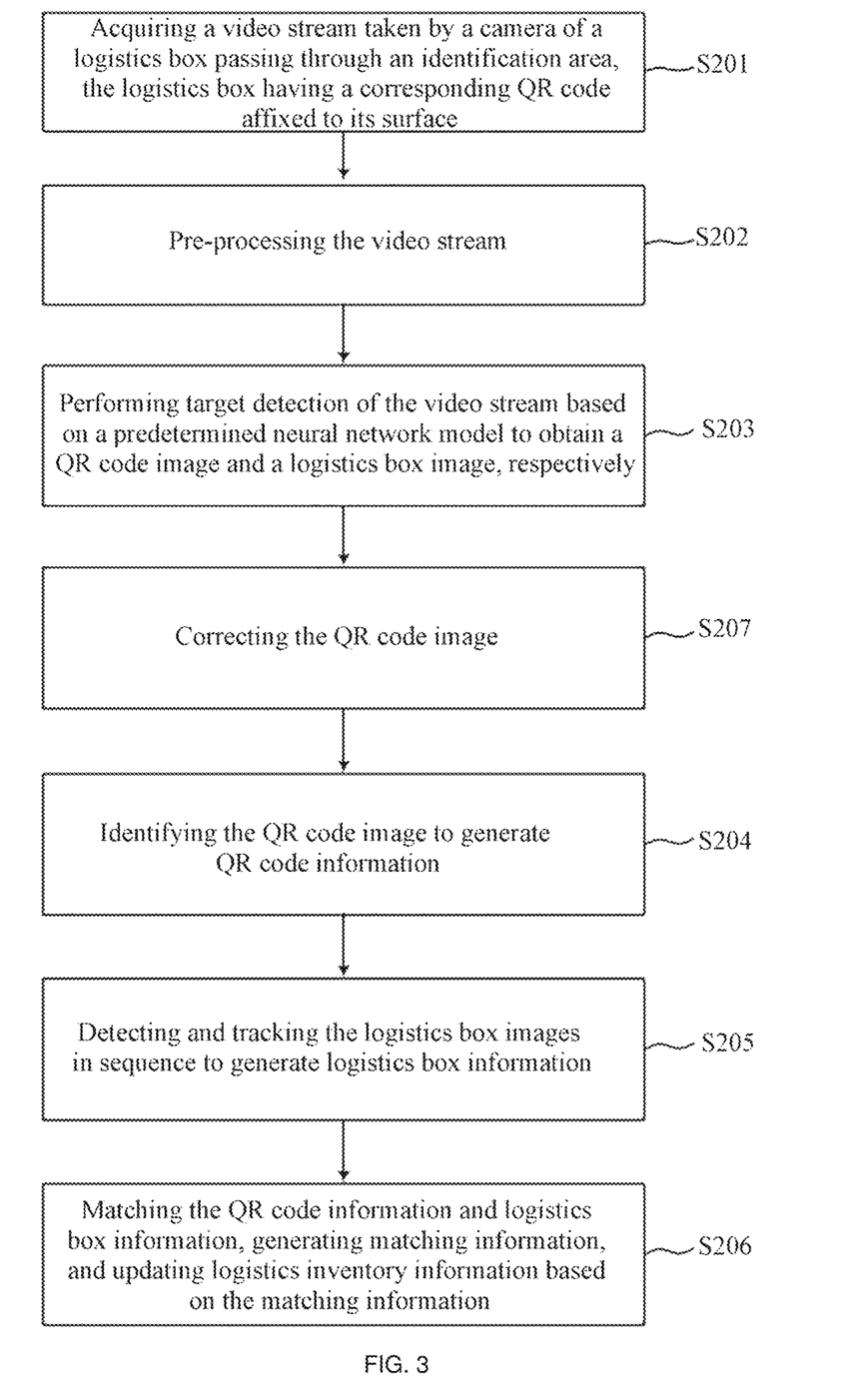
FIG. 3 is a diagram of an alternative embodiment of Embodiment 2 of the present disclosure.

As in FIG. 3, in an alternative embodiment, before generating the QR code information, it is also necessary to correct the intercepted QR code image, i.e., before the step S204, there is: S207, correcting the QR code image.

The correction process is performed by image processing, digital processing to remove noise from the QR code image, specifically comprising: re-sizing multiple the QR code images to a uniform size; and/or adjusting the contrast and brightness of the QR image to preset values; and/or Grayscale converting of the QR code image; and/or filtering the QR code image; and/or binarizing the QR code image; and/or detecting the QR code image by Canny edge detector; and/or applying Hough operator fitted straight line and affine transformation to the QR code image.

Wherein, adjusting the contrast and brightness of the QR code image can achieve the effect of increasing the separation between the QR code and the background. Grayscale operation is performed on the image, i.e., a three-channel color image is converted into a single-channel grayscale image. It helps to reduce the complexity of the calculation to increase the speed of decoding.

In the filtering process, alternatively, Gaussian filtering can be used to achieve the effect of filtering out random Gaussian noise in the image. Further, bilateral filtering can also be used, i.e., a pixel value weighting term is added to the Gaussian filtering to take into account not only the distance factor but also the pixel value difference, which can achieve the technical effect of removing the noise points on the image while protecting the edge information of the QR code.

Binarization means black and white, and the image by binarization has the effect of getting edge information more easily.

Optionally, performing an Erosion on the image followed by a Dilation operation can achieve the effect of enlarging cracks and low-density areas, eliminating small objects, and smoothing the boundaries of larger objects without changing their area.

Canny edge detector can detect the bounding contours of barcodes, distinguish the image from surrounding non-relevant information, and improve detection accuracy.

Since the image captured by the device generally contains the QR code image and the background, it is necessary to isolate the whole QR code from the whole image, i.e., the Hough operator fitted straight lines is used to is to position the QR code, mainly by extracting the graph edge straight lines for positioning, and from all the straight lines fitted by the Hough operator, the similar straight lines are deleted and the straight lines with larger gaps are retained. In this way, the four edges that meet the requirements are obtained. Finally, the coordinates of the four vertices of the quadrilateral are calculated based on the four lines found. The effect of affine transformation is to find the leftmost vertex based on the calculated coordinates of the four vertices, and use the vertex as the starting point for sorting; then calculate the slopes ($\Delta y/\Delta x$) of this point and the rest connected lines in turn, and arrange them in order according to the slope from smallest to largest. Finally, the four coordinates are sorted clockwise using the vertex coordinates for affine transformation to obtain a corrected QR image.

In the present disclosure the video stream is detected to intercept the QR code image and logistics image in the area, and the QR code information and the logistics box information are identified, realizing the matching management of the QR code and the logistics box.

Embodiment 3

Figure 4:
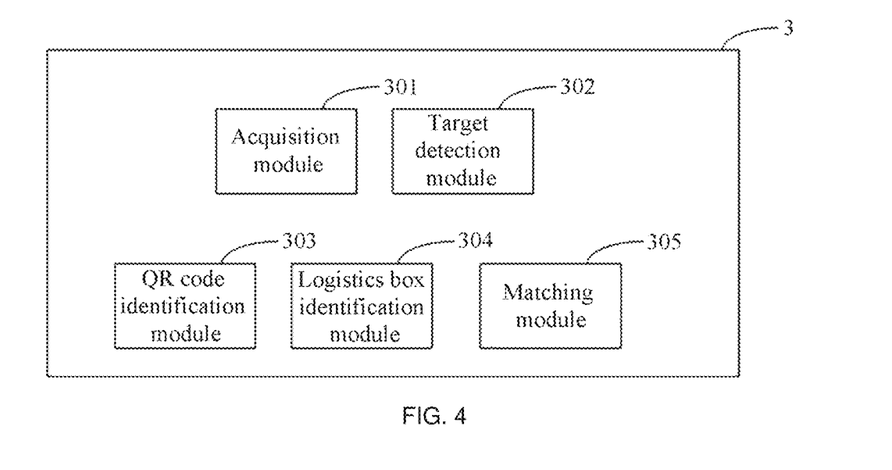
FIG. 4 is a diagram of the module of a system for logistics management based on QR code in Embodiment 3 of the present disclosure.

The present disclosure provides a system 3 for logistics management based on QR code, as shown in FIG. 4, which comprises the following modules:

an acquisition module 301, for obtaining a video stream taken by a camera of a logistics box passing through an identification area, the logistics box having a corresponding QR code affixed to surface.

a target detection module 302, for performing target detection of the video stream based on a predetermined neural network model to obtain a QR code image and a logistics box image, respectively; the module is specifically used to: identify a QR code image in the video stream based on a predetermined first view model; identify a logistics box image in the video stream based on a predetermined second view model; intercept the QR code image and the logistics box image from the video stream.

a QR code identification module 303, for identifying the QR code image to generate QR code information.

a logistics box identification module 304, for detecting and tracking the logistics box image in sequence to generate logistics box information.

a matching module 305, for matching the QR code information and logistics box information, generating matching information, and updating logistics inventory information based on the matching information.

Figure 5:
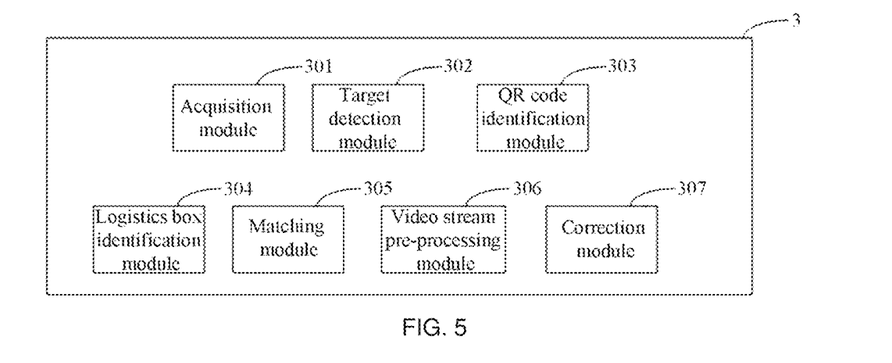
FIG. 5 is a diagram of the module of an alternative embodiment of Embodiment 3 of the present disclosure.

As in FIG. 5, in an alternative embodiment, the system further comprises: a video stream pre-processing module 306, for pre-processing the video stream. The module is specifically used to: decode the video stream; and denoise the decoded video stream.

The system further comprises: a correction module 307, for correcting the QR code image. The module specifically includes: re-sizing multiple the QR code images to a uniform size; and/or adjusting the contrast and brightness of the QR image to preset values; and/or Grayscale converting the QR code image; and/or filtering the QR code image; and/or binarizing the QR code image; and/or detecting the QR code image by Canny edge detector; and/or applying Hough operator fitted straight line and affine transformation to the QR code image.

The present embodiment provides a system 3 for logistics management based on the QR code, which can execute the QR code based logistics management method provided by any embodiment of the present disclosure, having the functional modules and beneficial effects corresponding to the execution method.

Embodiment 4

Figure 6:
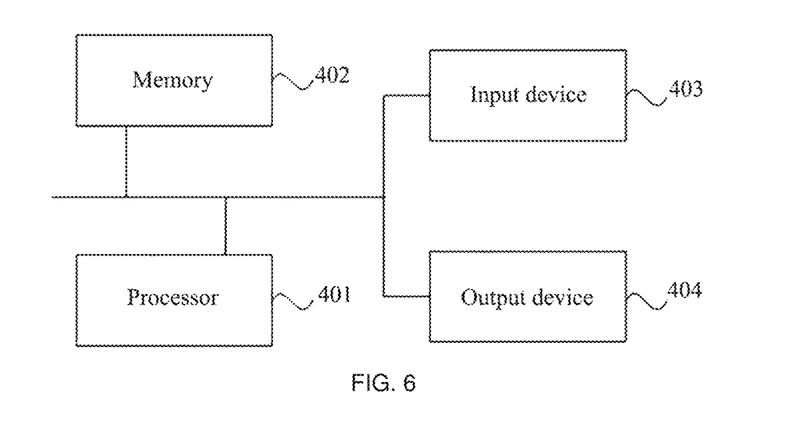
FIG. 6 is a diagram of a server module of Embodiment 4 of the present disclosure.

The present embodiment provides a schematic diagram of the structure of a server, as shown in FIG. 6, which includes a processor 401, a memory 402, an input device 403, and an output device 404; the number of processors 401 in the server may be one or more, and one processor 401 is used as an example in the drawing; the processor 401, the memory 402, the input device 403, and the output devices 404 in the device/terminal/server may be connected via a bus or other means, and FIG. 6 shows the connection via a bus as an example.

The memory 402, as a computer readable storage medium, can be used to store software programs, computer executable programs, and modules, such as the program instructions/modules corresponding to the method for logistics management based on the QR code in the embodiment of the present disclosure. The processor 401 executes various functional applications of the device/terminal/server and data processing by running the software programs, instructions, and modules stored in the memory 402, i.e., realizing the above-described QR code-based logistics management method.

The memory 402 may primarily include a stored program area and a stored data area, wherein the stored program area may store the operating system, the application programs required for at least one function; the stored data area may store data created based on the use of the terminal, etc. In addition, the memory 402 may include high-speed random access memory, and may also include non-volatile memory, such as at least one disk memory device, flash memory device, or other non-volatile solid state memory device. In some examples, the memory 402 may further include memory that is remotely located relative to the processor 401, and these remote memories may be linked to the device/terminal/server via a network. Examples of the networks include, but are not limited to, the Internet, corporate intranets, local area networks, mobile communication networks, and combinations thereof.

Input device 403 may be used to receive incoming numeric or character information, and to generate key signal input related to user settings of the device/terminal/server and control of functions. The output device 404 may include a display device such as a display screen.

By providing a server that can execute the logistics management method based on the QR code provided by any embodiment of the present disclosure, embodiment 4 of the present disclosure has the functional modules and beneficial effects corresponding to the execution method.

Embodiment 5

The present disclosure also provide a computer readable storage medium having a computer program stored thereon, which when executed by a processor implements a method for logistics management based on the QR code as provided in any embodiment of the present disclosure, the method comprises:

acquiring a video stream taken by a camera of a logistics box passing through an identification area, the logistics box having a corresponding QR code affixed to surface.

performing target detection of the video stream based on a predetermined neural network model to obtain a QR code image and a logistics box image, respectively.

identifying the QR code image to generate QR code information.

detecting and tracking the logistics box images in sequence to generate logistics box information.

matching the QR code information and logistics box information, generating matching information, and updating logistics inventory information based on the matching information.

The computer-readable storage medium of an embodiment of the present disclosure may employ any combination of one or more computer-readable media. The computer-readable medium may be a computer-readable signal medium or a computer-readable storage medium. The computer readable storage medium may be, for example, but not limited to, an electrical, magnetic, optical, electromagnetic, infrared, or semiconductor system, apparatus, or device, or any combination of the above. More specific examples of computer-readable storage media (a non-exhaustive list) include: electrical links having one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, magnetic memory devices, or any suitable combination of the above. For the purposes of the present document, a computer-readable storage medium may be any tangible medium that contains or stores a program that can be used by or in conjunction with an instruction execution system, apparatus, or device.

The computer-readable signal medium may include a data signal propagated in the baseband or as part of a carrier wave that carries computer-readable program code. This propagated data signal can take a variety of forms, including but not limited to electromagnetic signals, optical signals or any suitable combination of the above. The computer-readable signal medium may also be any computer-readable medium other than a computer-readable storage medium that sends, propagates, or transmits a program for use by or in conjunction with an instruction execution system, apparatus, or device.

The program code contained on the storage media may be transmitted using any suitable medium, including but not limited to wireless, wire, fiber optic cable, RF, etc., or any suitable combination of the above.

Computer program code for performing the operations of the disclosure can be written in one or more programming languages or combinations thereof, including object-oriented programming languages such as Java, Smalltalk, C++, and also conventional procedural programming languages such as "C" language or similar programming languages. The program code may be executed entirely on the user's computer, partially on the user's computer, as a stand-alone package, partially on the user's computer and partially on a remote computer, or entirely on a remote computer or terminal. In the case of a remote computer, the remote computer may be linked to the user computer over any kind of network including a local area network (LAN) or a wide area network (WAN) or, alternatively, may be linked to an external computer (e.g., using an Internet service provider to link over the Internet).

Note that the foregoing is only embodiments and the technical principles employed in the present disclosure. It should be understood by those skilled in the art that the present disclosure is not limited to the particular embodiments described herein, and that various obvious variations, readjustments and substitutions can be made by those skilled in the art without departing from the scope of protection of the present disclosure. Thus, although the present disclosure is described in some detail by the above embodiments, the present disclosure is not limited to the above embodiments, but may include more other equivalent embodiments without departing from the conception of the present disclosure, the scope of which is determined by the scope of the appended claims.

What is claimed is:

1. A method for logistics management based on a quick response (QR) code, wherein, comprising: acquiring a video stream taken by a camera of a logistics box passing through an identification area, the logistics box having a corresponding QR code affixed to surface; performing target detection of the video stream based on a predetermined neural network model to obtain a QR code image and a logistics box image, respectively; identifying the QR code image to generate QR code information; detecting and tracking the logistics box images in sequence to generate logistics box information; and matching the QR code information and logistics box information, generating matching information, and updating logistics inventory information based on the matching information; wherein performing the target detection of the video stream based on the predetermined neural network model to obtain the QR code image and the logistics box image, respectively, comprises: identifying the QR code image in the video stream based on a predetermined first view model; identifying the logistics box image in the video stream based on a predetermined second view model; and intercepting the QR code image and the logistics box image from the video stream.

2. The method according to claim 1, wherein, before performing target detection of the video stream based on the predetermined neural network model to obtain the QR code image and the logistics box image, respectively, further comprising: pre-processing the video stream.

3. The method according to claim 2, wherein, pre-processing the video stream comprising:
decoding the video stream;
denoising the decoded video stream.

4. The method according to claim 1, wherein, before identifying the QR code image to generate QR code information, further comprising:
correcting the QR code image.

5. The method according to claim 4, wherein, correcting the QR image comprising:
re-sizing multiple the QR code images to a uniform size; and/or
adjusting a contrast and brightness of the QR image to a preset value; and/or
Grayscale converting the QR code image; and/or
filtering the QR code image; and/or
binarizing the QR code image; and/or
detecting the QR code image by Canny edge detector; and/or
applying Hough operator fitted straight line and affine transformation to the QR code image.

6. A system for logistics management based on a quick response (QR) code, wherein, comprising: an acquisition module, configured to obtain a video stream taken by a camera of a logistics box passing through an identification area, the logistics box having a corresponding QR code affixed to its surface; a target detection module, configured to perform target detection of the video stream based on a predetermined neural network model to obtain a QR code image and a logistics box image, respectively; a QR code identification module, configured to identify the QR code image to generate QR code information; a logistics box identification module, configured to detect and track the logistics box image in sequence to generate logistics box information; a matching module, configured to match the QR code information and logistics box information, generate matching information, and update logistics inventory information based on the matching information; wherein performing the target detection of the video stream based on the predetermined neural network model to obtain the QR code image and the logistics box image, respectively, comprises: an identification of the QR code image in the video stream based on a predetermined first view model; an identification of the logistics box image in the video stream based on a predetermined second view model; and an interception of the QR code image and the logistics box image from the video stream.

7. The system according to claim 6, wherein, further comprising: a video stream pre-processing module, configured to pre-process the video stream.

8. A server, comprising: a memory, a processor and a program stored in the memory and runnable on the processor, wherein the processor executes the program to implement the method for logistics management based on the QR code according to claim 1.

9. A non-transitory computer readable storage medium, having a program stored thereon, wherein the program, when executed by a processor, is capable of implementing the method for logistics management based on the QR code according to claim 1.

* * * * *